US005721982A

United States Patent [19]
Wakabayashi et al.

[11] Patent Number: 5,721,982
[45] Date of Patent: Feb. 24, 1998

[54] DISPLAY DEVICE FOR A CAMERA FOR ACCURATELY DISPLAYING A RANGEFINDING SPOT

[75] Inventors: Hiroshi Wakabayashi, Yokohama; Daiki Tsukahara, Hiratsuka, both of Japan

[73] Assignee: Nikon Corporation, Tokyo, Japan

[21] Appl. No.: 516,986

[22] Filed: Aug. 18, 1995

[30] Foreign Application Priority Data

Aug. 18, 1994 [JP] Japan ................................ 6-194045

[51] Int. Cl.⁶ ................................................ G03B 17/20
[52] U.S. Cl. .......................... 396/148; 396/89; 396/149
[58] Field of Search ................................ 354/195.13, 199, 354/221, 289.12, 409, 474; 396/89, 111, 147, 148, 149

[56] References Cited

U.S. PATENT DOCUMENTS

| | | | |
|---|---|---|---|
| 4,855,782 | 8/1989 | Kobayashi et al. | 354/475 |
| 5,019,854 | 5/1991 | Mukai et al. | 354/471 |
| 5,204,715 | 4/1993 | Nakanishi et al. | 354/475 |
| 5,235,380 | 8/1993 | Yamada et al. | 354/471 |
| 5,241,337 | 8/1993 | Betensky et al. | 354/219 |
| 5,452,034 | 9/1995 | Ichikawa et al. | 354/221 |

FOREIGN PATENT DOCUMENTS 5-66463   4/1984   Japan.

*Primary Examiner*—Daniel P. Malley

[57] ABSTRACT

A camera viewfinder device adapted for use in a camera having a photographic lens for photographing a subject and a rangefinder system for producing rangefinding information. The viewfinder device includes a display unit having multiple display parts that indicate a rangefinding spot within a viewfinder field and a control device that selectively controls the illumination and indication states of the multiple display parts of the display unit to produce the rangefinding spot based on information about photographic conditions including the focal length of the photographic lens and the rangefinding information. Also provided is a display device for use in a camera having a photographic lens for photographing a subject and a rangefinder system for producing rangefinding information. The display device includes a display unit defining a field of view and having multiple electro-luminescent or electro-optical display parts that indicate a rangefinding spot within the field of view and a control device controlling the illumination or indication states of the multiple electro-luminescent or electro-optical display parts of the display unit to produce the rangefinding spot based on information about photographic conditions including the focal length of the photographic lens and the rangefinding information.

20 Claims, 5 Drawing Sheets

DISPLAY DEVICE FOR A CAMERA FOR ACCURATELY DISPLAYING A RANGEFINDING SPOT

BACKGROUND OF THE INVENTION

1. Field of the Invention

The present invention relates to a viewfinder device suitable for use in a rangefinder-type camera. More particularly, the present invention relates to a viewfinder device for a camera which enables the display of a rangefinding point or spot that is adjusted according to the field of view defined by a camera lens.

2. Description of the Related Art

Among recently developed compact cameras, there is an increasing number of models with built-in zoom lenses. Accordingly, it is preferable to have a zoom finder which functions in accordance with variable magnifying lenses such as built-in zoom lenses.

Furthermore, image-type rangefinders that adjust their focal lengths in accordance with automatic focusing (hereinafter referred to as "AF") operations and that determine the field of view via a distance measurement have increasingly been used in order to fully provide an AF function.

However, with such rangefinder cameras, parallax between the field of view seen through a viewfinder and that through the lens varies when the photographic distance changes and the rangefinding marks inside the viewfinder cannot display the correct rangefinding point or spot because of manufacturing errors and because the size of the rangefinding marks do not properly change according to when the photographic magnification rate changes due to zooming.

As such, when photographing with a camera having the aforementioned type of viewfinder, the photographer can not take a well-visualized photograph with an accurate rangefinding point or spot. Additionally, without utilizing the viewfinder system effectively, the photographer is not able to perform a well balanced photographic shot, especially when shooting the subject at close range.

SUMMARY OF THE INVENTION

Accordingly, a primary object of the present invention is to solve the aforementioned problems of the conventional cameras.

It is another object of the present invention to provide a display device for a camera that accurately displays a rangefinding spot within a viewfinder of a camera.

It is another object of the present invention to provide a viewfinder display device for use with a camera wherein a rangefinding spot is accurately displayed in a rangefinder regardless of the effects of parallax and the like caused by differences in imaging characteristics realized from having multiple optical systems.

It is still another object of the present invention to provide a viewfinder display device for use with a camera having a zoom-type lens wherein a rangefinding spot is accurately displayed in a rangefinder regardless of the zoom state of the subject to be photographed and the effects of parallax and the like caused by differences in imaging characteristics realized from having multiple optical systems.

It is still another object of the present invention to provide a viewfinder display device that can accurately display a rangefinding spot regardless of the particular camera traits of a camera that result from variances in the manufacturing process of that camera.

Objects of the present invention are achieved by providing a camera viewfinder device adapted for use in a camera having a photographic lens for photographing a subject and a rangefinder system for producing rangefinding information. The viewfinder device includes a display unit having multiple display pads that indicate a rangefinding spot within a viewfinder field and a control device that selectively controls the indication states of the multiple display pads of the display unit to produce the rangefinding spot based on information about photographic conditions including the focal length of the photographic lens and the rangefinding information.

Finally, objects of the present invention are further achieved by providing a display device for use in a camera having a photographic lens for photographing a subject and a rangefinder system for producing rangefinding information. The display device includes a display unit defining a field of view and multiple electro-optical display parts that indicate a rangefinding spot within the field of view and a control device controlling the indication states of the multiple electro-optical display parts of the display unit to produce the rangefinding spot based on information about photographic conditions including the focal length of the photographic lens and the rangefinding information.

BRIEF DESCRIPTION OF THE DRAWINGS

The aforementioned and other objects and advantages of the present invention will become apparent and more readily appreciated from the following description of the preferred embodiment, taken in conjunction with the accompanying drawings, of which.

DETAILED DESCRIPTION OF THE PREFERRED EMBODIMENT

Figure 1:
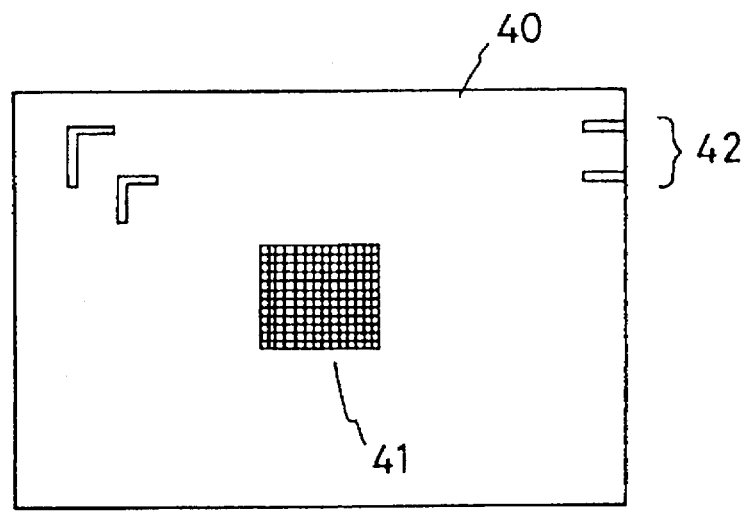
FIG. 1 is an diagram that shows a display pattern within a field of view of a camera viewfinder device according to a preferred embodiment of the present invention.

Reference will now be made in detail to the present preferred embodiments of the present invention, examples of which are illustrated in the accompanying drawings, wherein like reference numerals refer to like elements throughout.

More particularly, FIGS. 1 through 7 show a preferred embodiment of a camera viewfinder device according to the present invention. The outlined configuration of the camera to which the present invention is applied and its viewfinder display device is explained briefly with reference to FIGS. 2 through 5.

Figure 2:
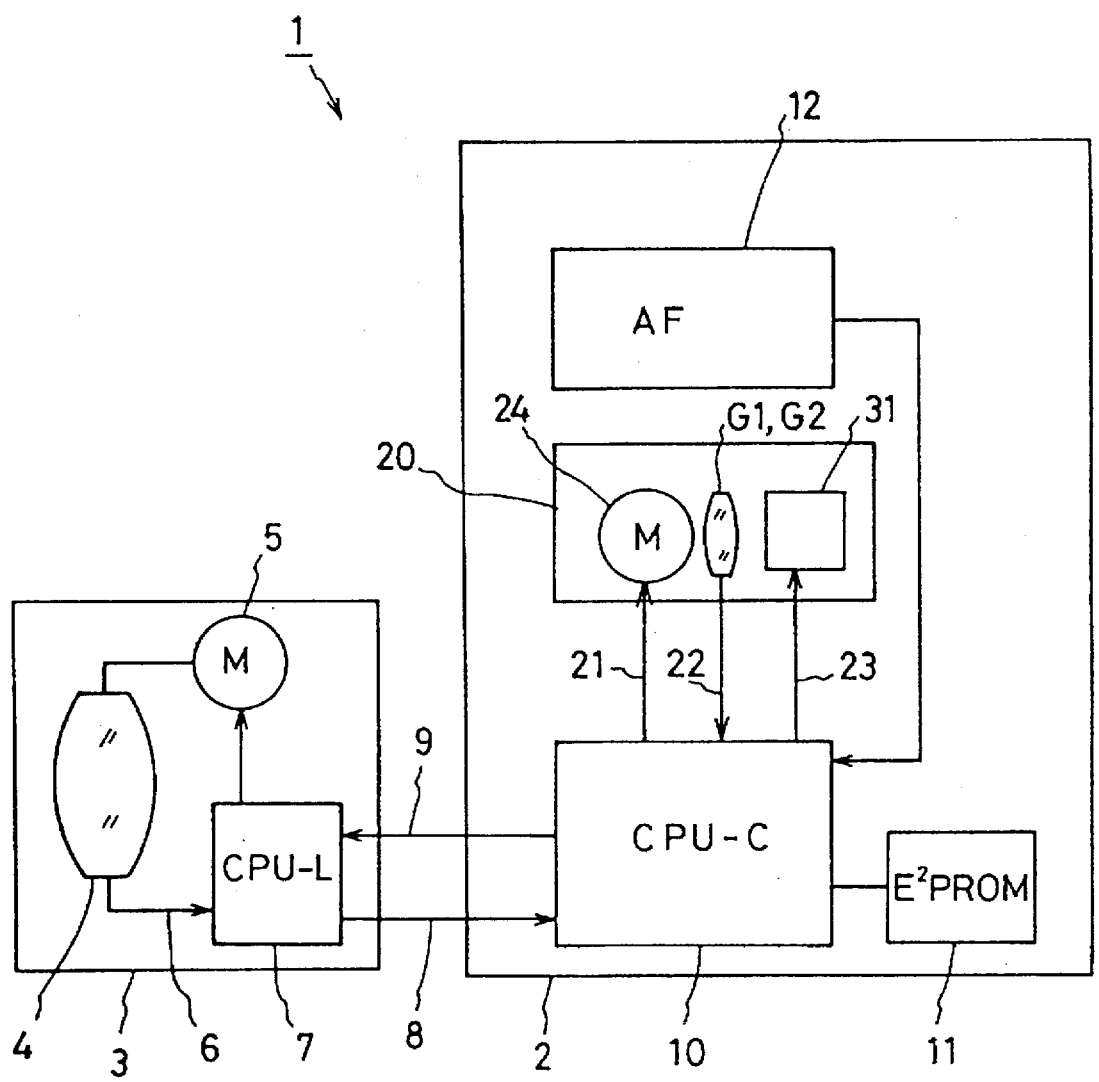
FIG. 2 is a block diagram illustrating the overall configuration of a camera that includes the preferred embodiment of a camera viewfinder device according to the present invention.

Turning now to FIG. 2, therein illustrated is a block diagram of a camera to which the present preferred embodiment of the present invention is applied. Camera 1 is equipped with a camera body 2 and an inter-changeable lens barrel 3 mounted onto the center front of camera body 2.

Photographic lens 4 comprises a photo-optical system which is retained in lens barrel 3. A photo-optical system drive unit 5 (e.g., a photographic lens driver) drives zooming and focusing operations of camera 1 by moving a part of, or the entirety of, photographic lens 4.

A photo-optical position detection unit 5, such as an encoder, is provided on photographic lens 4 to detect the drive position of photographic lens 4. There are some cases in which a position detection signal is not required, such as when the photo-optical position detection unit 5 is a step-drive motor or a like system.

A photo-optical system control circuit 7 (e.g., CPU-L) is provided within lens barrel 3 and which controls the position of photographic lens 4 by receiving as input the position detection signals 6 of photographic lens 4 from photo-optical position detection unit 5. Also, photo-optical system control circuit 7 transmits lens condition signals such as control status, zooming status, focal point indications, etc. to camera body control circuit 10 (e.g., CPU-C).

A photo-optical signal output path 8 carries condition signals of photographic lens 4, such as focal length and focusing status, via a lens mount section (not shown) disposed between the photographic lens 4 and the camera body 2. Camera body control circuit 10 is provided in camera body 2 which is described in detail below.

A photo-optical system signal receiving path 9 inputs condition indication signals to photo-optical system control circuit 7 to control the operation of photographic lens 4. Such inputs are carried via a lens mount section (not shown) in a conventional manner.

Camera body control circuit 10 is installed within camera body 2 and detects the status of photographic lens 4 in lens barrel 3 and generates the aforementioned condition indication signals. An EEPROM (E²PROM) 11 is a memory device installed in control circuit 10 and is configured to measure the variance of viewfinder magnification in the viewfinder device which is explained below. Variations of the focal length of photographic lens 4, variances in mechanical parts of the zooming system, and discrepancies between the AF system and the viewfinder during the assembling and adjusting processes of the camera are then recorded by camera body control circuit 10 in a conventional memory device such as a RAM or other volatile memory. It should be understood that by the term "CPU" as used in the figures, it is intended that one of ordinary skill in the art will know that a CPU includes, but is often not limited to, a control circuit, a volatile memory unit, a non-volatile memory unit, an ALU, etc.

An AF unit 12 is installed in camera body 2 to detect the focused position of the subject image, etc. and to perform the focusing drive control of photographic lens 4 inside lens barrel 3 by sending the detected values to camera body control circuit 10 in the camera body.

Figure 4:
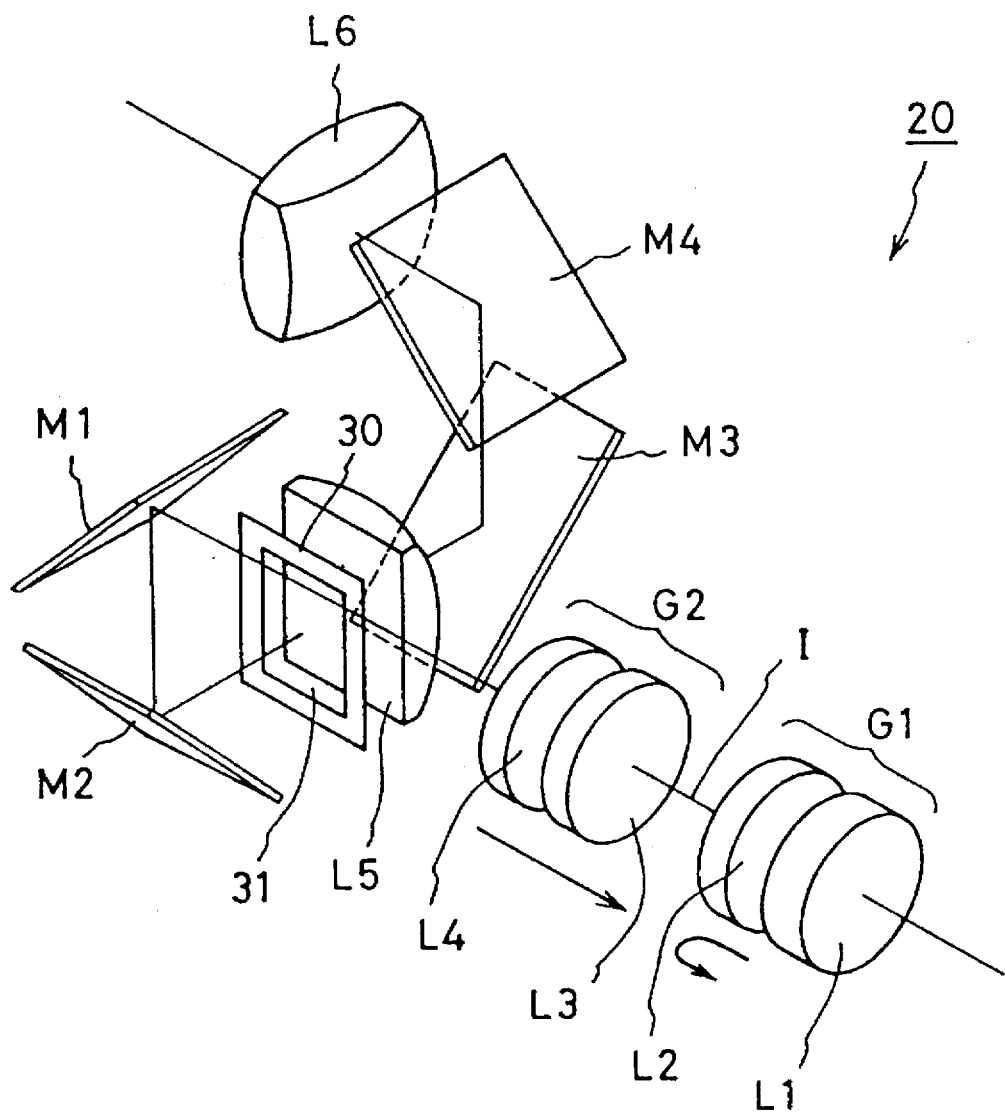
FIG. 4 is a schematic diagram of the viewfinder optical system of the camera depicted in FIG. 3.
Figure 5:
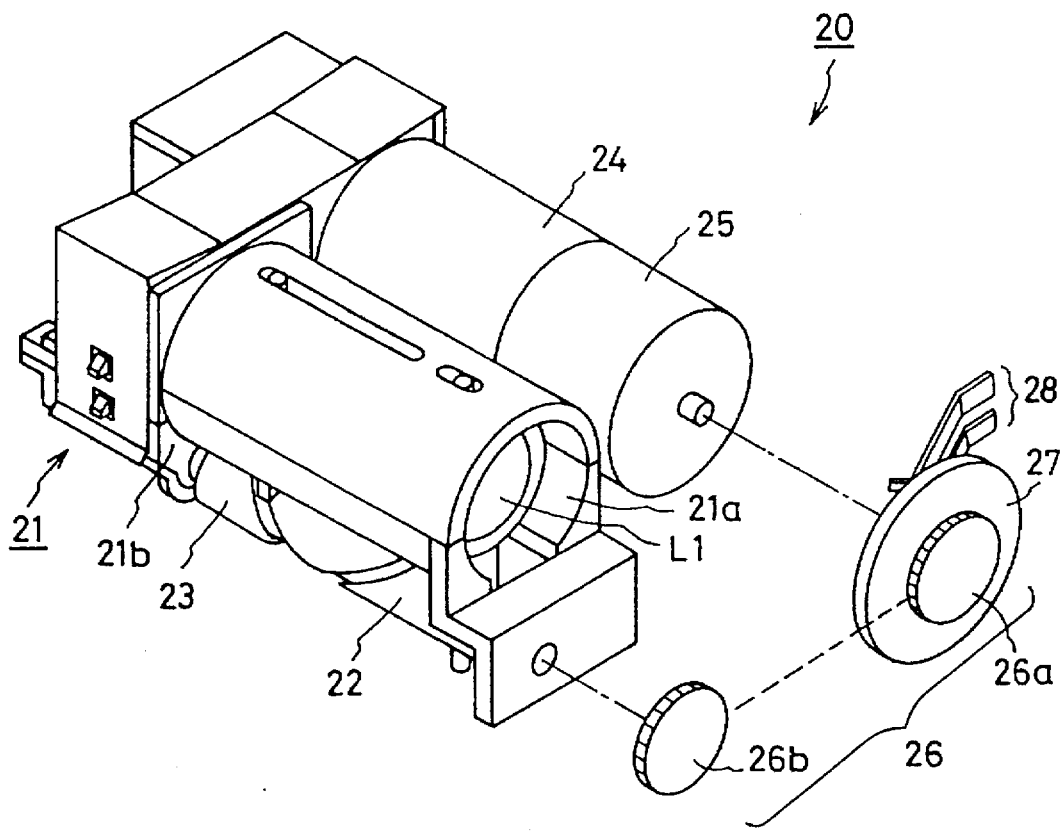
FIG. 5 is a schematic perspective view of a configuration of the essential parts of the viewfinder device of the camera depicted in FIG. 3.

A viewfinder unit 20 is assembled in camera body 2 and its details are shown in FIGS. 4 and 5.

In FIG. 2, a viewfinder drive signal 2-21 is transmitted as a lens zooming signal to motor 24 in viewfinder unit 20 from camera body control circuit 10. Moreover, a viewfinder optical system position signal 2-22 carries the optical position of viewfinder optical system to camera body control circuit 10.

Additionally, a viewfinder display signal 2-23 is output from camera body control circuit 10 to perform display operations using a display element 31. Display element 31 may be a liquid crystal display (LCD) or an LED display unit that is installed in the viewfinder unit 20.

The details of viewfinder unit 20 and a rangefinder therein, which is integrated in the above-described camera body 2, is briefly explained by reference to FIGS. 4 and 5. In FIG. 4 the viewfinder optical system of the camera invariable lens chamber comprises variable magnifying lenses L1–L4, mirrors M1–M4, a condenser lens L5 and an eyepiece lens L6.

A viewfinder case 21 (FIG. 5) is equipped with the variable magnifying lenses in a variable lens chamber 21a and the mirrors in a chamber 21b. The first lens group, G1, comprising variable magnifying lenses L1 and L2, and the second lens group, G2, comprising variable magnifying lenses L3 and L4, are placed in variable lens chamber 21a. The lenses in the first lens group G1 move in the direction of the arrow or in the opposite direction of the arrow shown in FIG. 4 through optical axis I by the action of a movement unit which is described below. Consequentially, viewfinder unit 20 is set for an angle of view and magnification in accordance with the focal length of the photographic lens.

Motor cams 22 and 23 of the viewfinder optical system drive cam adjusts the zooming positions of lens groups G1 and G2 by retaining variable magnifying lenses L1, L2 and L3, L4 and moving them in the direction of optical axis I. The position of lens groups G1 and G2 are adjusted for zooming by transmitting the rotational drive force of motor 24, which is installed next to variable lens chamber 21a. Accordingly, motor 24 serves as an actuator via reduction gear mechanism 25 and transmission gears 26. Transmission gears 26 include transmission gear unit 26a and cam drive gear 26b.

Also, in FIG. 5 an encoder 27 outputs viewfinder optical position signals to camera body control circuit 10 by detecting the rotational position of the transmission gear unit 26a to control the drive characteristics of motor 24. A brush 28 receives the encoder signal at the camera body control circuit 10.

Figure 3:
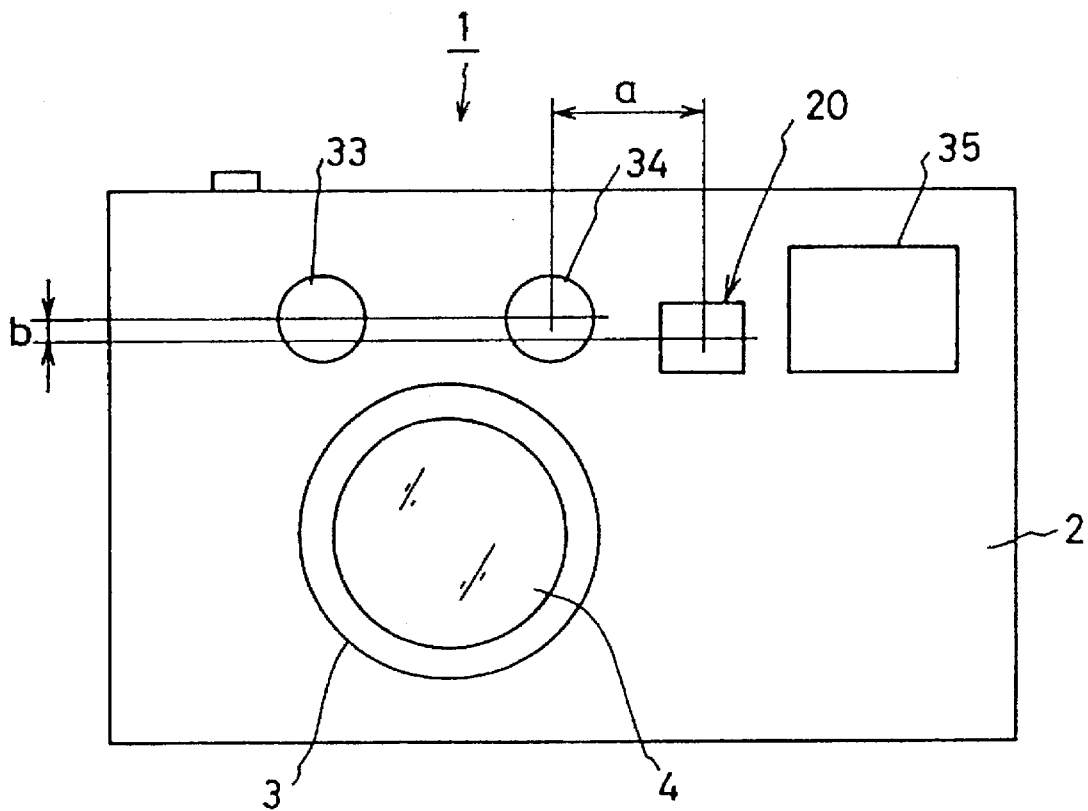
FIG. 3 is a front view of the camera illustrated in the block diagram of FIG. 2.

In viewfinder unit 20 illustrated in FIG. 3 and FIG. 4, field of view frame 30 determines the field of view of the viewfinder. A condenser lens L5 can also be installed. Additionally, the present preferred embodiment of the present invention is configured so that a display element 31, such as an LCD, etc., is provided as a display device to provide multiple display sections and the information such as parallax (the difference between the field of view seen through the viewfinder and that of the photographic lens) and range finding points can be displayed in display element 31 which is to be disposed in field of view frame 30.

It should be understood that the embodiments of the present invention are not limited to an LCD, and a display element such as an LED or an electro-chromic (EC) device that provides displays photoelectrically, may also be used.

In any event, FIG. 4 illustrates that the light that travels through optical axis I of variable magnifying lenses L1–L4, is reflected at mirrors M1 and M2 and forms an image near the field of view frame 30. This image is reflected on mirrors M3 and M4 through condenser lens L5. The image is enlarged and may be viewed through the eyepiece lens L6.

Also, when photographic lens 4 is operated for zooming, the motor cams 22 and 23 (FIG. 5) are also operated depending on the amount of drive of motor 24. Accordingly, such movement of motor 24 moves lens groups G1 and G2 in the direction of optical axis I and therefore changes the angle of view and magnification of the viewfinder, thereby, successfully achieving the function of the viewfinder according to the preferred embodiment of the present invention.

The drive characteristics of the viewfinder display device of the camera related to the present preferred embodiment are controlled as described below. When the zooming focal length of photographic lens 4 and the shooting distance are determined, signals are produced which are transmitted from photographic lens control circuit 7 (CPU-L) and are received by camera body control circuit 10 (CPU-C) in the camera body 2.

Based on the compensation signals sent from EEPROM 11, camera body control circuit 10 transmits an activation signal to motor 24, and receives the position signal of the encoder 27 from the brush 28, thereby adjusting the position of the viewfinder optical system and setting the viewfinder magnification so as to be appropriately related to the position of photographic lens 4.

Referring now to FIG. 3, therein illustrated is a front view of camera 1 which shows the parallax of viewfinder unit 20 (e.g., window sections). In FIG. 3, also provided is a photometric window 33, rangefinding window 34 and a strobe window 35. Such structures are arranged in a parallel manner and along the window section of the viewfinder unit 20, on the upper front part of the camera body 2.

As shown by dimensions "a" and "b," due to the difference between the range (field of view of the finder) seen through viewfinder unit 20 and the actual screen on the film (i.e., the field of view of the photographic lens) parallax occurs. In this case, as in the case of a compact-type camera, the rangefinding window 34 determines the rangefinding point or spot and the difference between the focal points of two such optical systems is called parallax.

Figure 7:
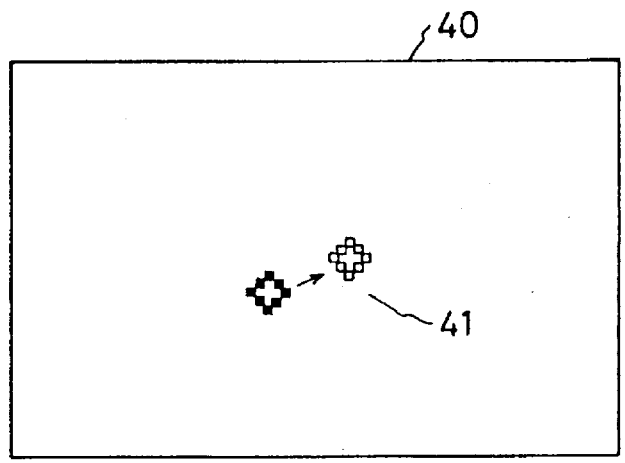
FIG. 7 is a schematic diagram of a display within the field of view of a viewfinder display device during a zooming operation according to the preferred embodiment of the present invention.
Figure 6A:
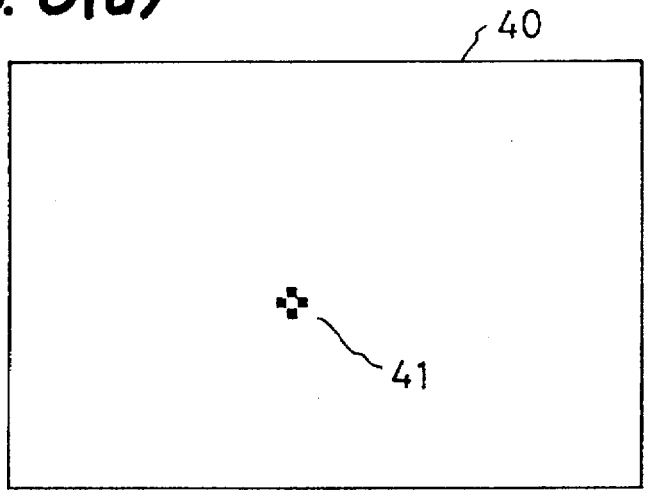
FIGS. 6(a), 6(b) and 6(c) are exemplary views of display patterns in the field of view of the viewfinder device of the camera depicted in FIG. 3.
Figure 6B:
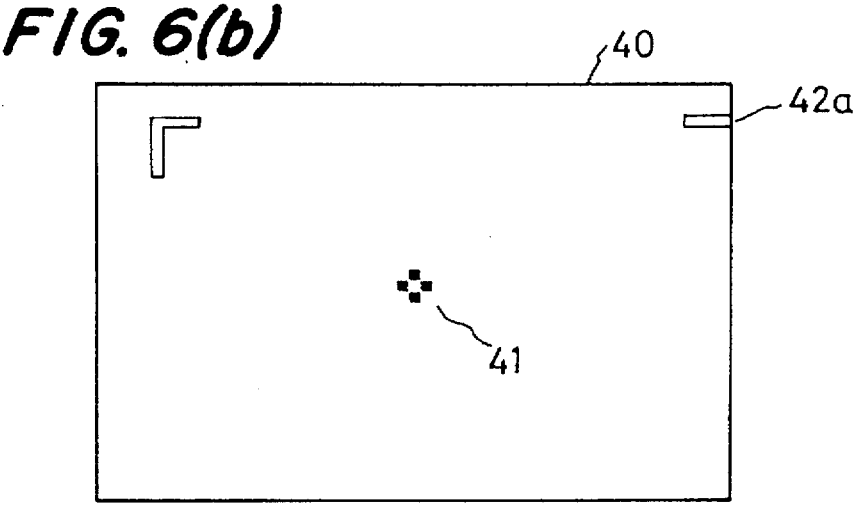
Figure 6C:
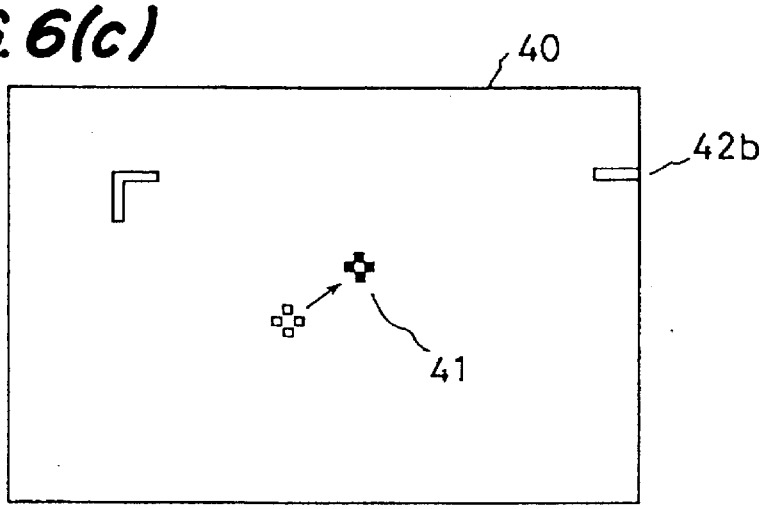

Referring again to FIG. 1, a matrix-type display pattern 41 displays the rangefinding point or spot as formed near the rangefinding position in the field of view of a viewfinder display unit 40 (as maintained in the viewfinder unit 20 as shown in FIG. 3). Additionally, camera body control circuit 10 (CPU-C) is installed as a control device to selectively control the display of the aforementioned rangefinding point or spot shown by display pattern 41 based on the information about the shooting distance and the focal length. Camera body control circuit 10 is configured so that the display of the rangefinding point that corresponds to the information of the photographic conditions may be performed as shown in FIGS. 6(a)–6(c). Additionally, FIG. 7, illustrates one such display pattern 41 that may be selectively displayed in accordance with the control operations of camera body control circuit 10.

According to the present preferred embodiment, matrix-type display pattern 41 has been formed as multiple display sections in the vicinity of the rangefinding position of viewfinder unit 20 and is selectively displayed by camera body control circuit 10 based on the shooting distance and focal length. Accordingly, the display of an accurate rangefinding zone can be achieved even if the focal length of photographic lens 4 or the shooting distance changes.

In FIG. 1, a matrix-type display pattern 41 is shown in the center of the field of view of the viewfinder display unit 40. As such, the preferred embodiment of the present invention can respond to parallax caused by changes in shooting distance, changes in the size of the rangefinding point or spot due to zooming, and changes in the display of the rangefinding point or spot caused by errors made during the manufacturing process by selecting and activating a particular dot or pixel pattern on matrix-type display pattern 41. Also, it should be noted that on the edge of the field of view of viewfinder display unit 40 is a bracket-type display area 42 which shows the correct photographic field of view or frame of view that results due to parallax.

Furthermore, the present preferred embodiment is configured so that EEPROM 11 is a memory device that stores the selection of the photographic conditions during the manufacturing process of camera 1. Camera body control circuit 10 selectively controls the display of the rangefinding point by means of display pattern 41 so that, when camera 1 is in use, the display of the rangefinding point or spot via display pattern 41 may be selectively performed based on the stored information in an electrically erasable programmable read-only memory (EEPROM) 11 and on other photographic conditions.

As such, EEPROM 11 makes proper and accurate adjustments of the rangefinding point or spot to correct for any manufacturing errors within each part of the camera, enabling the accurate display of a rangefinding position.

FIGS. 6(a)–6(c) and FIG. 7 show examples of the display patterns of the rangefinding point or spot in the field of view of viewfinder display unit 40 as maintained in viewfinder unit 20 which is an essential part according to the present preferred embodiments of the present invention.

FIG. 6(a) shows the display pattern of the rangefinding point in the wide angle mode when a photographic subject is distant. FIG. 6(b) shows the display pattern of the rangefinding point in the telephoto mode when a photographic subject is at medium distance. In the display of FIG. 6(b), a first parallax compensation mark 42a is turned on in the edge of the display due to the occurrence of the parallax and the rangefinding point moves to the right relative to its position in FIG. 6(a), as it is clearly indicated by the illuminated pad of the display pattern 41.

Furthermore, in FIG. 6(c), display pattern 41 displays the rangefinding point or spot when photographic lens 4 is in a wide angle mode and the photographic subject is at close range. In this case, due to the increase of parallax, a second parallax compensation mark 42b is turned on at the edge of the screen and the rangefinding point moves slightly to the right when compared to the display of FIG. 6(b), as described above.

In reference to FIG. 7, display pattern 41 shows the display of the rangefinding point when a telephoto lens is selected by a zooming operation. In this case, the area showing the rangefinding point is enlarged due to the decreased angle of view. Subsequently, the rangefinding point moves to the upper right as shown by display pattern 41.

It should be noted that while the present invention has been described as being particularly suitable for a photographic type camera, the invention is not to be so limited. In fact, the present invention may be applied to other optical devices such as video cameras, laser optical systems, etc.

Finally, although preferred embodiments of the present invention have been shown and described, it will be appreciated by those skilled in the art that many changes may be made to such embodiments without departing from the principles and spirit of the invention, the scope of which is defined in the appended claims and equivalents thereof.

What is claimed is:

1. A camera viewfinder device adapted for use in a camera having a photographic lens for photographing a subject and a rangefinder system for producing rangefinding information, the camera viewfinder device comprising:

a display unit having multiple display parts that indicate a rangefinding spot within a viewfinder field; and a control device selectively controlling indication states of the multiple display parts of the display unit to produce the rangefinding spot based on information about photographic conditions including the focal length of the photographic lens and the rangefinding information, wherein said rangefinding spot changes in size depending upon a zooming state of the camera.

2. The camera viewfinder device of claim 1, wherein the control device further comprises a storage device storing predetermined information, whereby the control device displays the rangefinding spot based on the information stored in the storage device and the photographic conditions.

3. The camera viewfinder device of claim 1, wherein the control device further comprises a storage device storing information such as specific camera operational values attributable to the manufacture of the camera, the control device controlling the display of the rangefinding spot based on the information stored in the storage device.

4. The camera viewfinder device of claim 1, wherein the control device further comprises a storage device storing predetermined information, the control device controlling the display of the rangefinding spot based on the predetermined information stored in the storage device and the photographic conditions.

5. The camera viewfinder device of claim 1, wherein the display unit is a liquid crystal display device and wherein the multiple display parts are electro-optical segments of said liquid crystal display device.

6. The camera viewfinder device of claim 1, wherein the display unit further comprises a light emitting diode (LED) arrangement.

7. The camera viewfinder device of claim 2, wherein the storage device is a memory device.

8. The camera viewfinder device of claim 7, wherein the memory device is a read-only memory (ROM).

9. The camera viewfinder device of claim 2, wherein the storage device is a non-volatile memory device.

10. The camera viewfinder device of claim 9, wherein the non-volatile memory device is an electrically erasable programmable read-only memory (EEPROM).

11. The camera viewfinder device of claim 1, wherein the photographic lens is a zoom-type lens and the control device controls the indication states of the multiple display parts of the display unit so that the rangefinding spot accurately represents the zoom state of the subject to be photographed.

12. The camera viewfinder device of claim 1, wherein the photographic lens is a zoom-type lens and the rangefinder system further comprises a rangefinding optical system and wherein the control device controls the indication states of the multiple display parts of the display unit to accurately cause the rangefinding spot to represent the zoom state and a degree of parallax realized between imaging characteristics of the zoom-type lens and the rangefinding optical system.

13. The camera viewfinder device of claim 1, wherein the rangefinding system further comprises a rangefinding optical system and wherein the control device controls the indication states of the multiple display parts of the display unit to accurately cause the rangefinding spot to represent a degree of parallax respectively realized between imaging characteristics of the photographic lens and the rangefinding optical system.

14. A display device for use in a camera having a photographic lens for photographing a subject and a rangefinder system for producing rangefinding information, the display device comprising:

a display unit for defining a field of view and having multiple electro-optical display parts that indicate a rangefinding spot within the field of view; and a control device controlling indication states of the multiple electro-optical display parts of the display unit to produce the rangefinding spot based on information about photographic conditions including a focal length of the photographic lens and the rangefinding information, wherein said rangefinding spot changes in size based upon a zooming state of the camera.

15. The display device of claim 14, wherein the photographic lens is a zoom-type lens and the control device controls the indication states of the multiple display parts of the display unit so that the rangefinding spot represents the zoom state of the subject to be photographed.

16. The display device of claim 14, wherein the photographic lens is a zoom-type lens and the rangefinder system further comprises a rangefinding optical system and wherein the control device controls the indication states of the multiple electro-optical display parts of the display unit to cause the rangefinding spot to represent the zoom state and a degree of parallax realized between imaging characteristics of the zoom-type lens and the rangefinding optical system.

17. The display device of claim 14, wherein rangefinder system further comprises a rangefinding optical system and wherein the control device controls the indication states of the multiple electro-optical display parts of the display unit to cause the rangefinding spot to represent a degree of parallax realized between imaging characteristics of the photographic lens of the camera and the rangefinding optical system.

18. The display device of claim 14, wherein the display unit is a liquid crystal display device and wherein the multiple electro-optical display parts are electro-optical segments of said liquid crystal display device.

19. The display device of claim 14, wherein the display unit further comprises a light emitting diode (LED) arrangement and wherein each electro-optical display part of the multiple electro-optical display parts is a light emitting diode.

20. The display device of claim 14, wherein the multiple electro-optical display parts are arranged in a matrix and wherein the rangefinding spot is formed from at least one electro-optical display part of the multiple electro-optical display parts.

* * * * *